March 24, 1925.
J. T. NANCE
SCREW DRIVER
Filed April 26, 1924
1,530,905
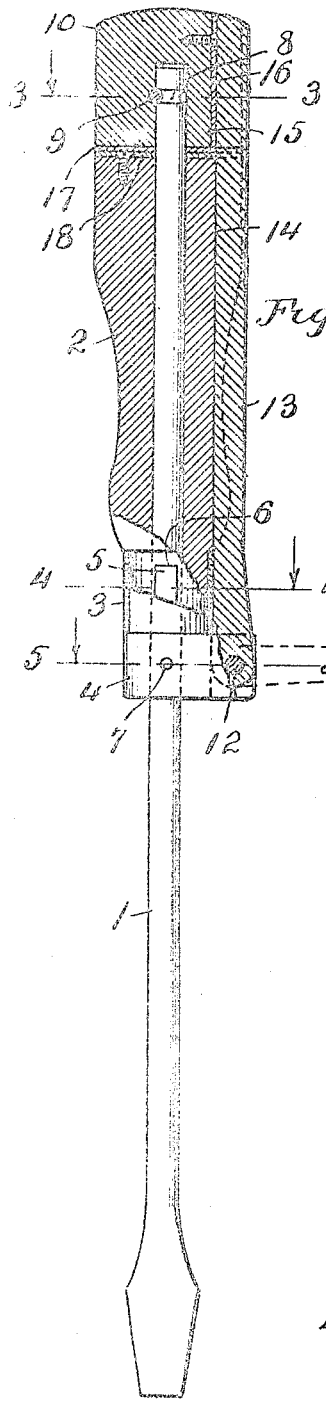
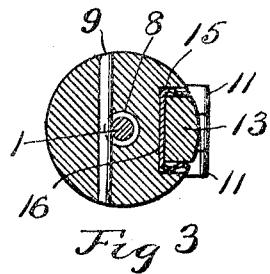
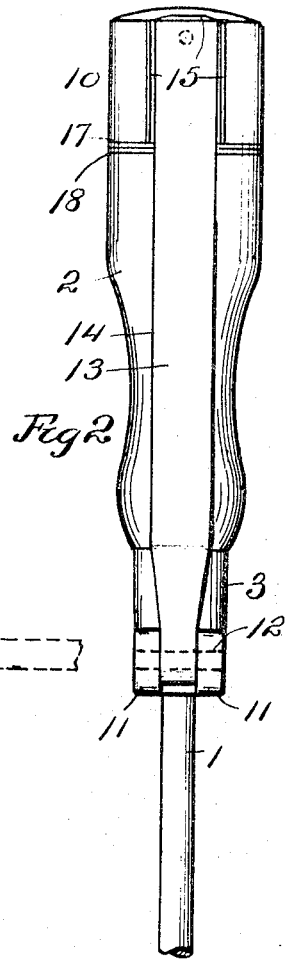
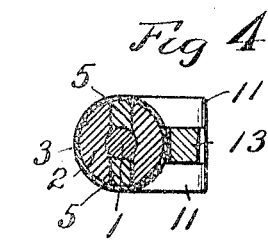
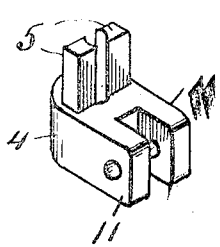
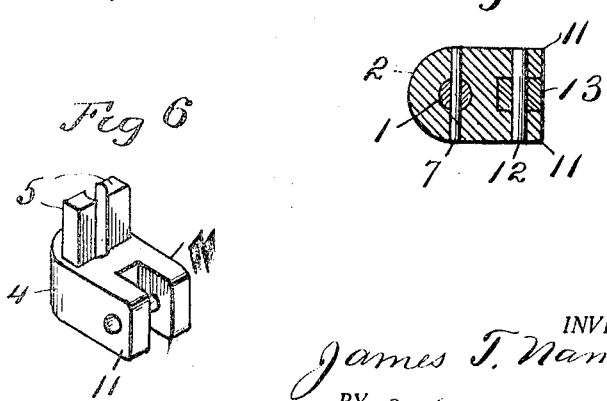
Witness:
R.E. Hamilton
INVENTOR.
James T. Nance
BY Warren W. House,
His ATTORNEY.

Patented Mar. 24, 1925.

1,530,905

UNITED STATES PATENT OFFICE.

JAMES T. NANCE, OF EAST KANSAS CITY, MISSOURI.

SCREW DRIVER.

Application filed April 26, 1924. Serial No. 709,143.

*To all whom it may concern:*

Be it known that I, JAMES T. NANCE, a citizen of the United States, residing at East Kansas City, in the county of Clay and State of Missouri, have invented a certain new and useful Improvement in Screw Drivers, of which the following is a specification.

My invention relates to improvements in screw drivers.

One of the objects of my invention is to provide a screw driver with which great leverage may be effected for turning the screw engaging shank of the screw driver.

A further object of my invention is to provide a novel construction, which is simple, cheap to make, strong and durable, not liable to get out of order, and which is easy to manipulate.

The novel features of my invention are hereinafter fully described and claimed.

In the accompanying drawing, which illustrates the preferred embodiment of my invention, Fig. 1 is a view of my improved screw driver shown partly in elevation and partly in longitudinal section.

Fig. 2 is a side elevation of the same, a part of the shank being broken away.

Fig. 3 is a cross section on the line 3—3 of Fig. 1.

Fig. 4 is a cross section on the line 4—4 of Fig. 1.

Fig. 5 is a cross section on the line 5—5 of Fig. 1.

Fig. 6 is a perspective view of the member to which the lever is pivoted.

Similar reference characters designate similar parts in the different views.

1 designates the usual screw engaging shank which has attached to it and rotatable with it a handle consisting, preferably, of a gripping member 2, a ferrule 3 fitted over one end of the member 2, and a lever supporting member 4 through which the shank 1 extends, and which has at one end two arms 5, which extend into the ferrule 3 and into a slot 6 provided therefor in the adjacent end of the member 2. The arms 5 hold the member 2 from turning with respect to the member 4. The latter has extending through it a pin 7, which also extends through the shank and holds the handle from turning on the shank.

The shank 1 adjacent to one end is provided with an annular peripheral groove 8, into which extends a transverse pin 9 which is fitted in a transverse hole provided therefor in a butt member 10, which is revoluble on the shank 1, at one end of the member 2.

The pin 9 holds the butt member 10 from longitudinal movement on the shank, while permitting rotation of the butt member with respect to the shank.

The member 4 has two parallel lateral ears 11, through which extend a transverse pin 12, on which is pivotally mounted a lever 13, disposed between the ears 11, and which is adapted to be swung from a position substantially parallel with the shank 1, as shown in solid lines in Figs. 1 and 2, to a position at right angles to the shank, as shown in dotted lines in Fig. 1.

The member 2 is provided with a longitudinal peripheral groove 14, adapted to receive the lever 13, when the latter is in the folded position parallel with the shank.

The butt member 10 is provided with a longitudinal peripheral groove 15, in which is mounted a metal plate having a channel portion 16, the flanges of which are parallel with the shank 1. The lever 13 is adapted to pass between the flanges of the channel portion 15 and to spread the flanges slightly, so that the flanges releasably grip the lever 13 for holding it in the folded position.

The metal plate 15 has a right-angled extension 17 disposed at the inner end of the butt member 10 and having extending through it the shank 1. The extension 17 bears against a washer 18 mounted on the shank 1 and fastened to the adjacent end of the member 2.

When the lever 13 is embraced by the flanges of the channel plate 15, the butt member 10 is held from turning relatively to the shank and handle.

In the usual operation of the screw driver, the lever 13 is disposed parallel with the shank 1, unless the screw turns hard, in which case the lever may be swung to the right-angled position shown in dotted lines in Fig. 1, and then used for assisting in turning the screw driver.

I do not limit my invention to the structure shown and described, as many modifications, within the scope of the appended claims, may be made without departing from the spirit of my invention.

What I claim is:—

1. A screw driver comprising a screw engaging shank, a handle attached thereto and rotatable therewith, a butt member revoluble on the shank at one end of the handle, and a lever pivoted to the handle so as to swing to and from a position parallel with the shank, the butt member having means for being lockingly engaged and held from turning on the shank, when the lever is parallel with the shank.

2. A screw driver comprising a screw engaging shank, a handle attached thereto and rotatable therewith, a butt member revoluble on the shank at one end of the handle and having a longitudinal peripheral groove, and a lever pivoted to the handle so as to swing to and from a position parallel with the shank and adapted to enter said groove when in the parallel position.

In testimony whereof I have signed my name to this specification.

JAMES T. NANCE.